United States Patent [19]

Mayfield

[11] Patent Number: 4,687,019

[45] Date of Patent: Aug. 18, 1987

[54] FLOAT VALVE ASSEMBLY

[76] Inventor: Windel O. Mayfield, P.O. Box 3005, Early, Tex. 76803

[21] Appl. No.: 798,857

[22] Filed: Nov. 18, 1985

[51] Int. Cl.$^4$ ............................................. F16K 15/04
[52] U.S. Cl. ................................ 137/375; 137/516.29; 137/519.5
[58] Field of Search ................. 137/375, 519.5, 516.25, 137/533.11

[56] References Cited

U.S. PATENT DOCUMENTS

| | | | |
|---|---|---|---|
| 3,134,572 | 5/1964 | Glasgow | 137/516.29 X |
| 3,498,315 | 3/1970 | Graves | 137/533.11 X |
| 3,534,767 | 10/1970 | Swinney | 137/375 |
| 3,771,556 | 11/1973 | Gifford | 137/533.11 |
| 4,224,961 | 9/1980 | Schnabel | 137/375 |

Primary Examiner—Robert G. Nilson
Attorney, Agent, or Firm—Staas & Halsey

[57] ABSTRACT

A float valve assembly comprises a valve body defining an internal chamber having upper and lower openings and a vertically movable ball or poppet in the chamber for moving upwardly to close the upper opening to prevent upward flow of fluid and for moving downwardly away from the upper opening to permit downward flow of fluid. A resilient, deformable seal positioned adjacent the upper opening has three separate seal elements to provide primary, secondary and tertiary sealing phases. The interior of the valve chamber is lined with a continuous liner to minimize abrasion of the valve. The liner and the resilient seal are formed simultaneously as a single unit by in-situ molding and curing of a thermosetting elastomer material.

12 Claims, 9 Drawing Figures

FIG. 1.
FIG. 2.
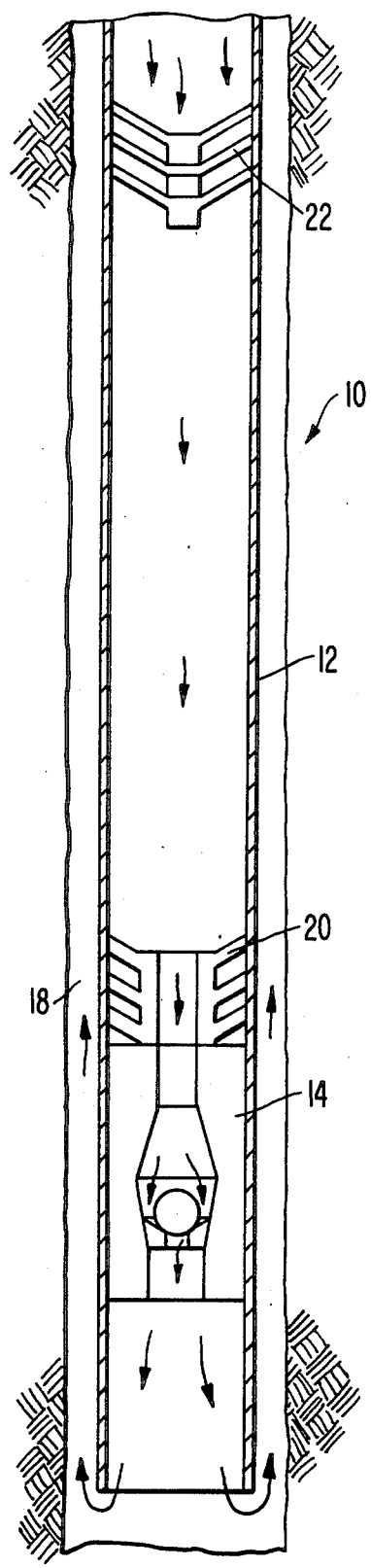
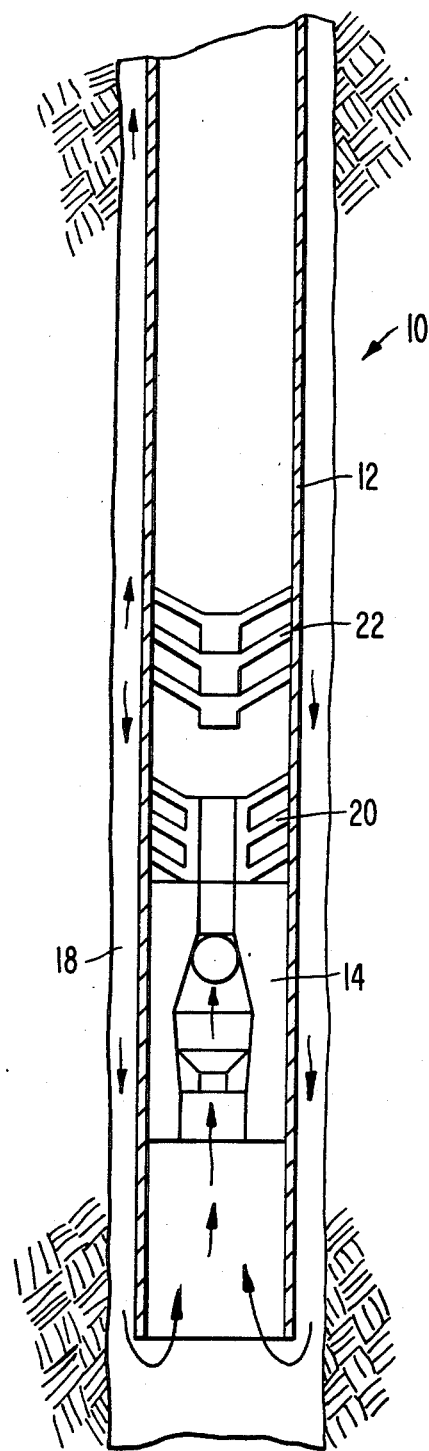

4,687,019

FLOAT VALVE ASSEMBLY

BACKGROUND OF THE INVENTION

1. Field of the Invention

The invention to which the present application pertains relates to float valves useful in connection with oil well cementing operations and in particular relates to float valves which are suitable for use in connection with float shoes, float collars and the like adapted for sub-surface cementing operations. Even more particularly, the device of the invention to which the present application pertains may be used to prevent the flow of fluid in an upward direction through the float collar or float shoe as a casing string is lowered into a well and to permit the flow of fluid in a downward direction through the casing during the cementing operation.

2. Description of the Prior Art

Float collars and shoes are devices which are well-known in the art to which the present invention pertains. These devices are used extensively in casing running and cementing operations in the downhole well bore. Shoes and collars may also be run on conductor casing, protection strings, intermediate strings and liners, in addition to production casing. After a well has been drilled to below the oil production layer, or strata, what is termed "production casing" may be run down inside the well bore to the bottom. Initially, the well bore is typically filled with a mixture of water, oil, drilling mud, etc. and it is desirable that such fluid mixtures do not enter the production casing as the latter is lowered into position within the well bore. To effect this, a guide shoe or float shoe device is attached to the first length of casing to be lowered into the well bore. Such shoes often have rounded noses to guide the casing around obstructions, ledges, etc. within the well bore.

The float collar or float shoe incorporates an internal float valve assembly in the nature of a check valve or one-way valve which prevents flow of the various fluids in the well upwardly into the casing string but which are capable of opening to permit pumping of cement downwardly during the cementing operation. Float valves are subject to extreme abrasive conditions during the cementing operation. Additionally, such valves must be capable of withstanding very high differential pressures during the lowering of the string to prevent backflow of the well fluids into the string as the same is lowered. The float valve assembly of the present invention incorporates design features which minimize damage from abrasion and at the same time provide maximum sealing characteristics to prevent backflow of well fluid.

SUMMARY OF THE INVENTION

The float valve assembly of the present invention is resistive to the abrasive conditions encountered during oil well cementing operations and provides an improved seal to prevent backflow of well fluids. To accomplish these ends, the invention of the present application provides a float valve assembly for use in oil well cementing operations which comprises a valve body defining an internal chamber having an inlet and an outlet and a valve seat adjacent the inlet. Resilient valve seal means are provided in the chamber on the seat and closure means are provided which are movable in the chamber toward and away from contact with the valve seal means for closing and opening the inlet. The seal means which are a part of a float valve assembly which incorporates the concepts and principles of the present invention include a pair of spaced deformable seal elements and a an intermediate contoured portion. The seal elements and the contoured portion are arranged and positioned along the path of movement of the closure means so that when the latter moves toward its said contact with the seal means it first contacts and deforms a first one of the elements to provide a primary seal, it then contacts and deform the other element to provide a secondary seal and it finally contacts the contoured portion to provide a tertiary seal. In a more particular aspect of the present invention, the elements and the contoured portion of the valve seal means are constructed of a single piece to present an integral seal unit. Even more particularly, the closure means is preferably circular in transverse cross-sectional configuration and the elements and the contoured portion of the seal means are annular. According to this aspect of the invention, the closure means has an annular contoured shoulder portion disposed and configured for contacting the contoured portion of the seal means in closely mated relationship to provide the tertiary seal.

In a particularly preferred aspect of the invention, the closure means comprises either a spherical ball or a spring loaded poppet having a spherically contoured shoulder and the contoured portion of the seal means comprises a spherical segment.

In another aspect of the invention, and in particular an aspect which minimizes abrasion, the float valve assembly of the present invention comprises a valve body defining an internal chamber having an inlet and an outlet and a valve seat adjacent the inlet. Resilient valve seal means are provided in the chamber on the valve seat and the assembly includes closure means movable in the chamber toward and away from contact with the seal means for closing and opening the inlet. Additionally, a generally continuous elastomeric, abrasion resistant liner means is provided which substantially cover the entirety of the interior surfaces of the chamber. In a more specific aspect of the invention, the valve seal means and at least a portion of the liner means are integrally interconnected, preferably by having been applied simultaneously as a single unit by in-situ molding and curing of a curable elastomer material. The in-situ molding and curing of the liner is facilitated by the fact that the body comprises upper and lower portions, each of which are frusto-conical in external shape. Thus, the body portions may be positioned exactly in a molding apparatus to facilitate molding and curing of a curable elastomer material on the internal surfaces thereof.

BRIEF DESCRIPTION OF THE DRAWING

FIGS. 1 and 2 are schematic, vertical, cross-sectional views of an oil well illustrating the oil well cementing operations which provide the environment for the preferred use of the present invention;

DETAILED DESCRIPTION OF THE INVENTION

Figure 3:
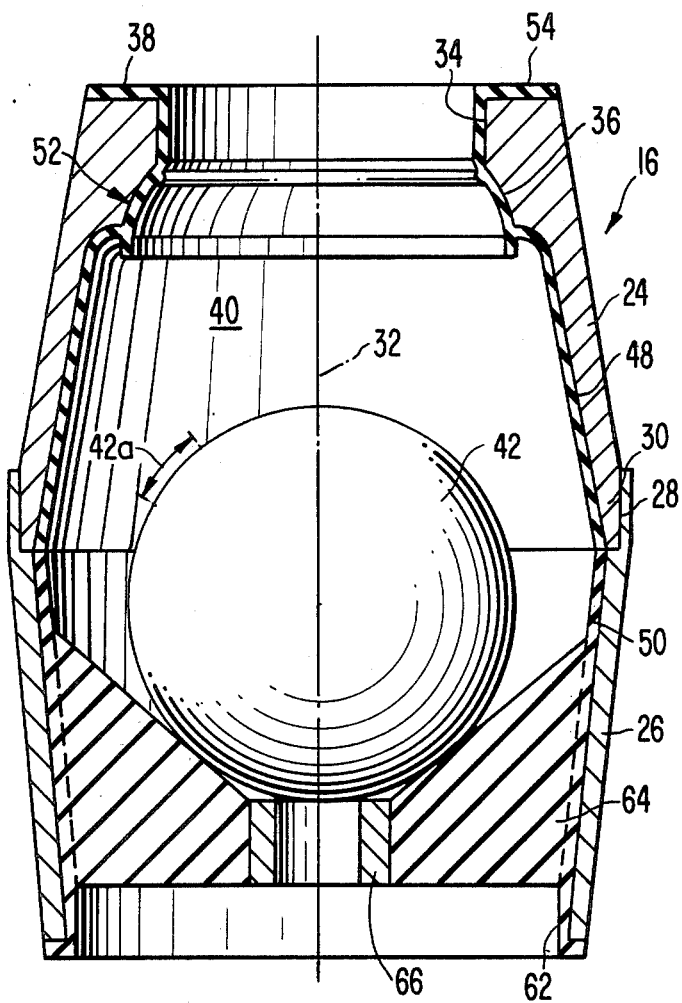
FIG. 3 is a vertical, cross-sectional view of a float valve assembly which embodies the principles and concepts of the present invention and which has been taken along line 3—3 of FIG. 4.

After a well bore is drilled it must be lined with a metal casing before the well can be completed. As the casing is run into the well bore, a housing or shoe containing a float valve is placed in the casing string near the lower end. When the casing is lowered into the well bore the float valve must be closed to keep the well fluid, which is mainly drilling mud, from entering the lower end of the casing. These conventional operations are illustrated schematically in FIGS. 1 and 2 wherein the reference numeral 10 refers to the well bore itself, the casing is referred to by the reference numeral 12 and the housing or shoe is referred to by the reference numeral 14. The shoe contains a float valve 16 which may preferably be a float valve assembly which embodies the principles and concepts of the present invention.

The buoyant force created by the displaced well fluid will help support the weight of the casing string 12. After string 12 has reached the desired depth, well fluid is pumped down through the casing to wash cuttings from the drilling process up through the annulus 18 between the well bore 10 and casing 12 and thus out of the well. A bottom wiper plug 20 is then forced down through the casing in a conventional manner by a cement mixture, thus displacing the fluid from the casing 12 until the plug 20 hits the float valve housing 14 and ruptures. The cement passes through the ruptured bottom plug 20, opens the float valve 16 and is forced out of the casing, thus displacing the well fluid upwardly through annulus 18. Conventionally the cement is followed by a top wiper plug 22 which is forced down through casing 12 by pumping a fluid, which is usually water, behind the plug. The cement will thus fill the annulus 18 between casing 12 and well bore 10. When all the cement has been displaced from inside casing 12, the top wiper plug 22 contacts the top of bottom plug 20 and the pumping will stop.

When the pressure created by the pumping has been released, the heavier cement mixture in annulus 18 will attempt to reenter casing string 12 through float valve 16. However, float valve 16 desirably operates to close the valve and prevent such reentry. The closed float valve 16 will thus hold the column of cement in annulus 18 until the cement hardens. After the cement has hardened, any cement inside casing 12 may be drilled out and removed. Depending on their location in casing 12, the float valve 16 and the wiper plugs 20 and 22 may also be removed by drilling.

A float valve assembly which embodies concepts and principles of the present invention and which is suitable for use in the environment described above is illustrated in FIG. 3 and is broadly referred to there by the reference numeral 16. Assembly 16 comprises an upper hollow valve body 24 and a lower hollow valve body 26. Valve bodies 24 and 26 may be of any one of numerous conventional materials including, but not limited to metals and thermosetting and thermoplastic molding compounds. The main characteristics for the valve body being that the same is of a strength and character to generally resist the temperatures and pressures conventionally encountered at the lower end of an oil well and during a cementing operation. In a preferred mode of the present invention, the valve body may be constructed of a heat resistant grade phenolic composition having a tensile strength of 6,500 psi; a compressive strength of 30,000 psi, a deflection temperature (264 psi) of 375° F., a tensile modulus of $1.4 \times 10^4$ psi, a UL temperature index (1/16 inch) of 160° C.; an impact izod of 0.33 ft.lbs./in., a flexural strength of 11,500 psi; and a specific gravity of 1.50. Such phenolic compositions are well-known to the routineer in this art and are available on the commercial market.

As can best be seen in FIG. 3, lower valve body 26 is provided with a counterbored cylindrical socket 28 and upper valve body 24 is provided with a cylindrically shaped lower extension 30 which is sized to be received in socket 28. Upper and lower valve bodies 24 and 26 are frusto-conical in external configuration, that is they are configured in the shape of a truncated cone. Socket 28 and cylindrical portion 30 provide means for joining upper and lower bodies 24 and 26 at their points of largest diameter and with their axes of rotational generation 32 disposed in vertical alignment.

Upper valve body 24 presents an upper inlet opening 34 disposed concentrically with axis 32. Upper valve body 24 also presents a valve seat 36 adjacent inlet 34 and an upper external sealing surface 38 which surrounds opening 34.

When assembled, upper and lower valve bodies 24 and 26 define an internal chamber 40 and in the embodiment according to FIG. 3 valve closure means in the nature of a sphere 42 is disposed in chamber 40. In another embodiment illustrated in FIG. 9, the valve closure means is in the form of a poppet 44 which is loaded by a spring 46 to provide a more positive seal. In either case, ball 42 and/or poppet 44 are circular in transverse cross-sectional configuration and the same are movable vertically within chamber 40 toward and away from valve seat 36.

Upper and lower valve bodies 24 and 26 are preferably configured in the shape of a truncated cone so that the same can be placed in a correspondingly conically shaped fixture whereby they may be fixed accurately and exactly to facilitate molding of an elastomer in-situ to form a generally continuous, elastomeric, abrasion resistant liner which covers the entirety of the interior surfaces of chamber 40. As shown in FIG. 3, a portion 48 of the liner is located in upper valve body portion 24 and another portion 50 of the liner is disposed on the interior surfaces of lower valve body portion 26. Also disposed on the interior surfaces of upper valve body 24, and within the chamber 40 is a one piece resilient valve seal means 52 located on valve seat 36. Additionally, an external, resilient compressible sealing element 54 is disposed on surface 38.

Figure 8:
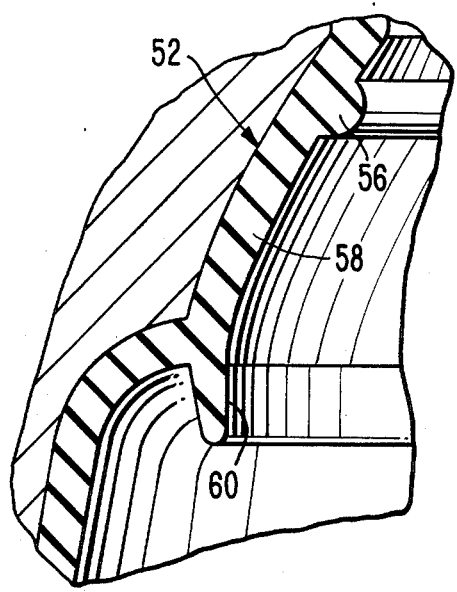
FIG. 8 is an enlarged, fragmentary, cross-sectional view illustrating details of the seal means forming a part of the float valve assembly of FIG. 3.

As can best be seen in FIG. 8, seal means 52 comprises an upper annular deformable bead seal element 56 which is smaller in diameter than the transverse cross-sectional configuration of ball 42 or poppet 44 as the case may be. Seal means 52 also includes an intermediate annular contoured portion 58 and an annular, outwardly deflectable seal element 60 which is preferably in the form of a cylindrical lower lip seal of lesser diameter than the transverse cross-sectional diameter of sphere 42 or poppet 44, again as the case may be. Preferably, contoured segment 58 is in the form of a spherical segment.

Figure 9:
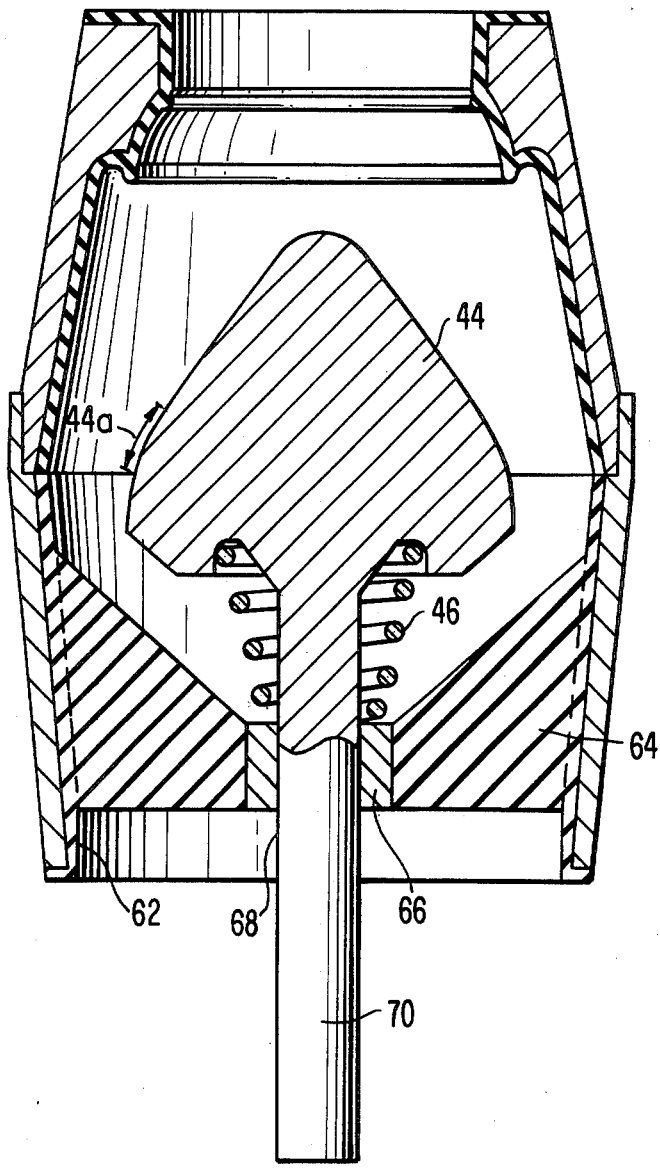
FIG. 9 is cross-sectional elevational view similar to FIG. 3 but illustrating another embodiment of the invention.

In lower valve body 26 there is an outlet opening 62 which is concentric with axis 32. Rib means in the nature of a plurality of individual ribs 64 are provided to extend radially adjacent outlet 62 for supporting either the ball 42 or the poppet 44, as the case may be, when either of the closure means is in its lower position as illustrated in FIGS. 3 and 9. The ball 42 (FIG. 3) and the poppet 44 (FIG. 9) are each movable vertically within chamber 40 into and out of engagement with seal 52 and thus toward and away from sealing contact with seal means 52 for closing and/or opening inlet 34. For such purpose, sphere 42 has a segment or portion 42a and poppet 44 has a segment or portion 44a, each presenting an annular contoured or arcuate shoulder which is of generally spherical configuration. In either case, shoulder 42a or shoulder 44a is disposed to sealingly contact the contoured, arcuate segment 58 in closely mated relationship when the respective closure means moves upwardly.

Figure 6:
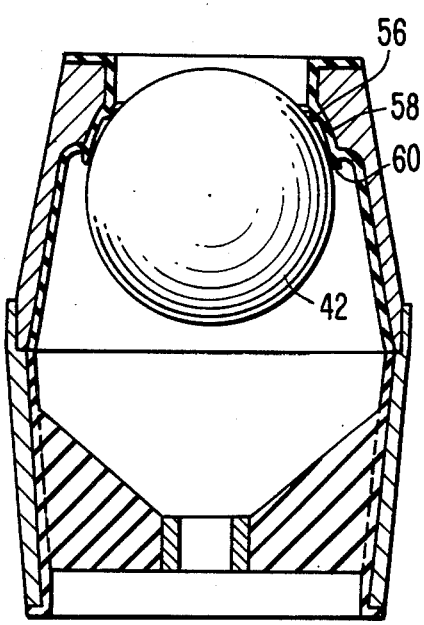
FIGS. 5, 6 and 7 are vertical cross-sectional views similar to FIG. 3 for schematically illustrating the operation of the closure means and seal means of the float valve assembly of the present invention.
Figure 5:
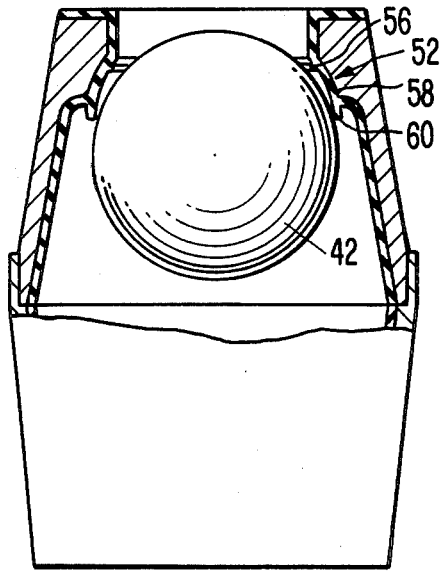
Figure 7:
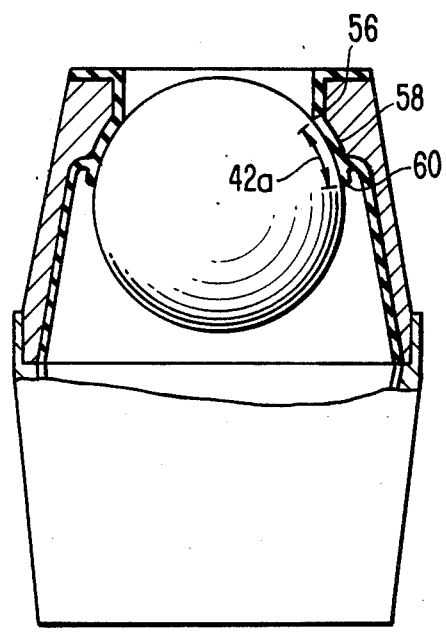
Figure 4:
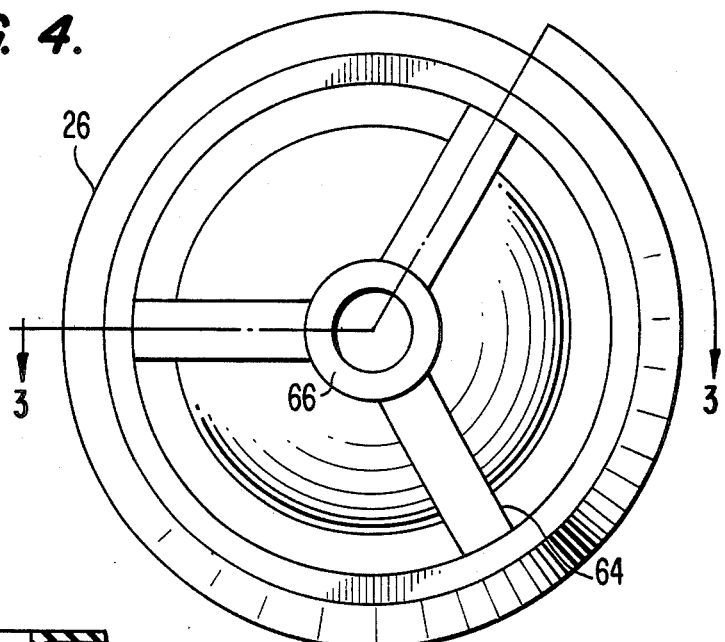
FIG. 4 is a plan view looking upwardly at the lower portion of a float valve assembly which embodies the principles and concepts of the present invention.

The operation of the closing and sealing mechanism of float valve assembly 16 is illustrated in FIGS. 5, 6 and 7. Viewing FIG. 5, it can be seen that as ball 42 (or poppet 44 if the FIG. 9 embodiment is in use) moves upwardly into contacting relationship relative to seal means 52, spherical segment 42a (or 44a) first contacts lip 60. Lip 60 is thus deformed outwardly and provides a primary seal relative to ball 42 (or poppet 44). With reference to FIG. 6, it can be seen that lip 60 is deflectable outwardly and placed into tension when contacted by shoulder 42a (or 44a) as ball 42 (or poppet 44) moves toward its inlet closing position. Thus, as ball 42 (or poppet 44) continues to move upwardly shoulder 42a (or 44a) comes into contact with bead 56 and the latter is deformed and compressed to provide a secondary seal.

As ball 42 (or poppet 44) continues to be forced upwardly by the existing pressure differential, shoulder 42a (or 44a) comes into contact with the complimentarily contoured spherical portion 58. Since portion 58 of sealing means 52 is preferably spherical in configuration and complimentary in shape relative to shoulders 42a and 44a. When bead 56 becomes completely compressed, shoulder 42a or 44a, as the case may be, will move into closely mated relationship relative to segment 58 to provide a tertiary seal as illustrated in FIG. 7.

As can be seen viewing FIG. 3, ribs 64 support the ball 42 when the latter is in its inlet clearing or opening position. Ribs 64 are preferably constructed of an elastomeric, relative abrasion resistant material and in the preferred mode of the invention ribs 64 are integrally interconnected with liner portion 50. Preferably, lower valve body 26 is placed in a correspondingly conically shaped jig or mold and the liner 50 and ribs 64 are applied simultaneously as a single unit by in-situ molding and curing of a curable elastomer material. As shown in FIGS. 3 and 9, the assembly also includes a guide bushing 66 for purposes best illustrated in connection with FIG. 9. In the FIG. 9 embodiment of the assembly which includes the poppet 44, bushing 66 includes a guide aperture 68 which is concentric with and proximal to opening 62. Poppet 44 includes a guide stem or rod 70 which is normally disposed to extend through aperture 68 as shown. Ribs 64 preferably extend radially between bushing 66 and the inner surfaces of lower body 26.

As discussed above, liner 48 is applied to upper valve body 24 by placing the latter in a correspondingly conically shaped jig and molding the liner 48 in-situ. In the preferred embodiment of the invention, liner 48, seal means 52 and sealing means 54 are all integrally interconnected and are applied simultaneously as a single unit by the in-situ molding and curing of a curable elastomer material in the same manner that liner 50 and ribs 64 of lower valve body 26 are formed as a single unit.

In each case, although a great number of suitable materials are known to those of ordinary skill in the art to which the present invention pertains, the purpose of the present invention is to provide internal valve assembly surfaces which are generally resistant to abrasion. Since the conditions at the bottom of the well may vary somewhat as to temperature and pressure and the abrasive nature of the fluids, a material must be selected in accordance with the conditions expected to be encountered. In the preferred mode of the invention, it has been found that a 0.07 inch covering of a cured nitrile thermosetting elastomer having a Durometer (Shore A) characteristic of 70 is appropriate for each of the elements that are molded in place. In the preferred mode of the invention, after curing the nitrile liner preferably has a tensile strength of about 3,500 psi; an elongation characteristic of 500%; a modulus at 100% of 350 psi at 200% of 990 psi and at 300% of 1,800 psi; a tear characteristic (die C) of 250 lbs/in.; and a specific gravity of 1.18.

Guide bushing 66 may be constructed of a phenolic material of the same characteristics as the body of the valve. During the molding process the guide bushing is simply placed and held in the mold so that the ribs and liner can then be molded and cured around it. In a valve assembly such as that illustrated in FIG. 3 where the poppet with stem is not used, the bushing is unnecessary and could be eliminated whereby ribs 64 would simply meet at the center.

Ball 42 and poppet 44 may also be molded from a phenolic composition having the same general characteristics as the body of the valve. For additional abrasion resistance these parts also might be coated with an abrasion resistant elastomer similar to the material used for the liner inside the valve chamber.

In use, assembly 16 is surrounded by concrete for purposes of holding the valve in place in shoe or housing 14. Sealing means 54 provides a seal between the external upper portion of the valve assembly and the surrounding concrete to assist in the prevention of leakage of well fluids around the valve assembly after it has been anchored within shoe or collar 14.

In placing the liners 48 and 50 and their associated parts in either the top or bottom body portion 24 or 26, the truncated conical shape of the body portion assists in critically positioning and supporting the body and maintaining the same in the mold so that the respective liner 48 and 50 may be applied. After a bonding agent is applied to the internal surfaces of the body portion the body portion is positioned in an appropriate correspondingly shaped conical jig, and a shaped mold is positioned inside the body in spaced relationship to and adjacent the internal surfaces thereof. Such mold of course has the appropriate correspondingly shaped features as the desired integral continuous element to be applied and in the top body portion 24 includes seal means 52, sealing means 54 and liner 48. In the bottom portion 26 the applied and molded element includes the ribs 64 as well as liner 50. The elastomer is disposed in the space between the mold and the internal surfaces of the body portion which defines the element to be applied by in-situ molding and curing. For this purpose, the elastomer composition may be deposited in the body portion before the mold is closed to form the molding space or it may be preheated and injected in plasticized form into the molding space. In either case it is put into its final form by application of compressive forces after being placed in the mold and heated to a plasticized condition. Continued application of heat then causes curing or vulcanization to occur. Thus, body portion, as set forth above, is held in correct position by the conically shaped positioning jig and pressure and temperature are applied in a conventional manner to cause the elastomer to cure in-situ. In the embodiment which includes bushing 66, the latter may be positioned and held in place inside the mold in a conventional manner during the molding process.

The principal feature which causes the present process to be different from previous molding processes is that the frusto-conical shape of the body is used for exact positioning and supporting of the latter in the mold so that the liners, various seal and sealing portions and ribs may be positioned accurately during the application of compression and heat to effect the in-situ molding and curing operation.

I claim:

1. A float valve assembly for use in oil well cementing operations comprising:
   a valve body defining an internal chamber having an inlet and an outlet and a valve seat at said inlet;
   resilient valve seal means in the chamber on said seat;
   closure means movable in the chamber toward and away from contact with said valve seal means for closing and opening said inlet;
   said valve seal means including a pair of deformable seal elements and a contoured portion, said elements and said portion being arranged and positioned along the path of movement of the closure means, said closure means being operable when the latter moves toward said contact with the seal means to first contact and deform a first one of said elements to provide a primary seal, to then contact and deform the other element to provide a secondary seal and to then contact the contoured portion to provide a tertiary seal.

2. A float valve assembly as set forth in claim 1 wherein the elements and the contoured portion of the valve seal means are constructed of a single piece to present an integral seal unit.

3. A float valve assembly as set forth in claim 1 wherein said closure means is circular in transverse cross-sectional configuration and said elements and said contoured portion are annular, said closure means having an annular contoured shoulder disposed and configured for contacting said contoured portion of the seal means in closely mated relationship to provide said tertiary seal.

4. A float valve assembly as set forth in claim 3 wherein the contours of said contoured shoulder and of said contoured portion comprise spherical segments.

5. A float valve assembly as set forth in claim 4 wherein said closure means comprises a sphere.

6. A float valve assembly as set forth in claim 4 wherein said closure means comprises a spring loaded poppet with an elongated guide stem.

7. A float valve assembly as set forth in claim 3 wherein said first element of the seal means comprises a cylindrical lip of smaller diameter than the transverse cross-section of the closure means, said lip being deflectable outwardly for placement into tension by contact with the contoured shoulder as the closure means moves toward its inlet crossing position to produce said primary seal.

8. A float valve assembly as set forth in claim 3 wherein said other element of the seal means comprises an annular bead of smaller diameter than sid transverse cross-section of the closure means, said bead being compressible by contact with said contoured shoulder as the closure means moves toward closing relationship with respect to said inlet to produce said secondary seal.

9. A float valve assembly as set forth in claim 8 wherein said first element of the seal means comprises a cylindrical lip of smaller diameter than the transverse cross-section of the closure means, said lip being deflectable outwardly for placement into tension by contact with the contoured shoulder as the closure means moves toward its inlet crossing position to produce said primary seal.

10. A float valve assembly as set forth in claim 9 wherein the elements and the contoured portion of the valve seal means are constructed of one piece to present an integral seal unit.

11. A float valve assembly as set forth in claim 10 wherein said contoured portion is disposed between said lip and said bead.

12. A float valve assembly for use in oil well cementing operations comprising:
    a valve body presenting an internal chamber with upper and lower openings and a valve seat adjacent said upper opening;
    resilient valve seal means in the chamber disposed on said seat in surrounding relationship to the upper opening;
    valve closure means movable vertically in the chamber into and out of engagement with the seal means, said closure means including an annular arcuate surface for sealingly contacting the seal means,
    said seal means including a lower annular, deformable, cylindrical lip seal portion of lesser diameter than said arcuate surface, an intermediate annular contoured portion having a shape which is complimentary to said arcuate surface and an upper annular deformable bead seal portion, said portions and said arcuate surface being arranged and disposed such that when the arcuate surface moves upwardly into engagement with the seal it first contacts and forms a primary seal with the lip seal portion, as further upward force is exerted on the closure means, the lip seal is deflected radially outwardly and the arcuate surface then contacts and forms a secondary seal with the bead seal portion, and as still further upward pressure is exerted on the closure means, the bead seal is deformed and said arcuate surface contacts the complimentarily contoured portion of the seat in closely mated relationship to thereby form a tertiary seal.

* * * * *